United States Patent
Yahata

(10) Patent No.: US 11,825,203 B2
(45) Date of Patent: Nov. 21, 2023

(54) IMAGE SENSING SYSTEM CAPABLE OF COMPENSATING A DIFFERENCE IN PHOTOSENSITIVITY FOR COLOR FILTERS CORRESPONDING TO DIFFERENT COLORS

(71) Applicant: SK hynix Inc., Icheon-si (KR)

(72) Inventor: Kazuhiro Yahata, Tokyo (JP)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/834,657

(22) Filed: Jun. 7, 2022

(65) Prior Publication Data

US 2023/0142349 A1    May 11, 2023

(30) Foreign Application Priority Data

Nov. 11, 2021 (KR) .................. 10-2021-0154999

(51) Int. Cl.
*H04N 23/72* (2023.01)
*H04N 23/71* (2023.01)
*H04N 25/11* (2023.01)

(52) U.S. Cl.
CPC ............. *H04N 23/72* (2023.01); *H04N 23/71* (2023.01); *H04N 25/11* (2023.01)

(58) Field of Classification Search
CPC ........ H04N 23/72; H04N 23/71; H04N 25/11; H04N 25/59; H04N 25/778; H04N 23/73; H04N 23/76; H04N 25/60; H04N 23/84; H04N 25/745; H04N 25/75; G06T 5/40
See application file for complete search history.

(56) References Cited

U.S. PATENT DOCUMENTS

| 10,027,938 | B2* | 7/2018 | Fujiwara | H04N 1/6086 |
| 2009/0278048 | A1* | 11/2009 | Choe | H01L 27/14652 |
| | | | | 250/339.05 |
| 2014/0347532 | A1* | 11/2014 | Kang | H04N 25/704 |
| | | | | 348/294 |
| 2018/0191974 | A1* | 7/2018 | Shim | H04N 25/778 |

FOREIGN PATENT DOCUMENTS

| KR | 20090117437 A | 11/2009 |
| KR | 20140136727 A | 12/2014 |
| KR | 20180079519 A | 7/2018 |

* cited by examiner

*Primary Examiner* — Luong T Nguyen
(74) *Attorney, Agent, or Firm* — Perkins Coie LLP

(57) ABSTRACT

An image sensing system includes an image sensor, a sensing controller, an additional unit, and a sensing parameter calculator. The image sensor includes a plurality of unit pixels and configured to generate raw image data indicative an image of an object from pixel signals from the plurality of unit pixels. The sensing controller is configured to control, based on a sensing parameter, a sensing condition of the image sensor for each set of the unit pixels. The parameter addition circuit is configured to obtain a parameter added data by adding the sensing parameter and the raw image data. The sensing parameter calculator is configured to calculate a distribution of pixel values for each set of the unit pixels, calculate an updated sensing parameter based on the distribution of pixel values, and transmit the updated sensing parameter to the sensing controller and the parameter addition circuit.

20 Claims, 6 Drawing Sheets

IMAGE SENSING SYSTEM CAPABLE OF COMPENSATING A DIFFERENCE IN PHOTOSENSITIVITY FOR COLOR FILTERS CORRESPONDING TO DIFFERENT COLORS

PRIORITY CLAIM AND CROSS-REFERENCE TO RELATED APPLICATION

This patent document claims the priority and benefits of Korean patent application No. 10-2021-0154999, filed on Nov. 11, 2021, which is incorporated by reference in its entirety as part of the disclosure of this patent document.

TECHNICAL FIELD

The technology and implementations disclosed in this patent document generally relate to an image sensing system including pixel units with color filters corresponding to different colors.

BACKGROUND

An image sensor is used in electronic devices to convert optical images into electrical signals. With the recent development of automotive, medical, computer and communication industries, the demand for highly integrated, higher-performance image sensors has been rapidly increasing in various electronic devices such as digital cameras, camcorders, personal communication systems (PCSs), video game consoles, surveillance cameras, medical micro-cameras, robots, etc.

SUMMARY

Various embodiments of the disclosed technology relate to an image sensing system capable of more effectively compensating for a difference in photosensitivity for color filters corresponding to different colors.

In one aspect, an image sensing system is provided to include an image sensor including a plurality of unit pixels, each unit pixel configured to convert an optical signal of an object into a pixel signal and including a color filter to allow incident light having a specific color to pass through for generating the optical signal, the image sensor configured to generate raw image data indicative an image of the object from pixel signals output from the plurality of unit pixels, a sensing controller communicatively coupled to the image sensor and configured to control, based on a sensing parameter, a sensing condition of the image sensor for each set of the unit pixels, that includes one or more unit pixels corresponding to a same color, a parameter addition circuit communicatively coupled to the image sensor and configured to obtain a parameter added data by adding the sensing parameter and the raw image data output from the image sensor, and a sensing parameter calculator communicatively coupled to the sensing controller and the parameter addition circuit and configured to calculate a distribution of pixel values for each set of the unit pixels based on the parameter added data received from the parameter addition circuit, calculate an updated sensing parameter based on the distribution of pixel values, and transmit the updated sensing parameter to the sensing controller and the parameter addition circuit.

In another aspect, an image sensing system is provided to include an image sensor including a first unit pixel set structured to detect light of a first color in incident light from an objected to be imaged and a second unit pixel set structured to detect light of a second color in incident light from the objected to be imaged, a sensing controller communicatively coupled to the image sensor and configured to control at least one of an exposure time, a conversion gain, or an analog gain for each of the first unit pixel set and the second unit pixel set, and a sensing parameter calculator communicatively coupled to the sensing controller and configured to calculate a first sensing parameter and a second sensing parameter for the first unit pixel set and the second unit pixel set, respectively, and provide the first sensing parameter and the second sensing parameter to the sensing controller such that the at least one of the exposure time, the conversion game, or the analog gain for each of the first unit pixel set and the second unit pixel set is based on the sensing parameter, wherein the first sensing parameter and the second sensing parameter are different from each other.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

This patent document provides implementations and examples of an image sensing system and the disclosed features may be implemented to achieve one or more advantages in more applications. Some implementations of the disclosed technology suggest designs of an image sensing system capable of effectively compensating for a difference in photosensitivity for color filters corresponding to different colors. The disclosed technology provides various implementations of an image sensing system which can obtain an image with less noise by more effectively compensating for a difference in photosensitivity for each color of color filters.

Reference will now be made in detail to certain embodiments, examples of which are illustrated in the accompanying drawings. Wherever possible, the same reference numbers will be used throughout the drawings to refer to the same or similar parts. The embodiments of the disclosed technology may provide a variety of effects capable of being directly or indirectly recognized through the disclosed technology.

Figure 1:
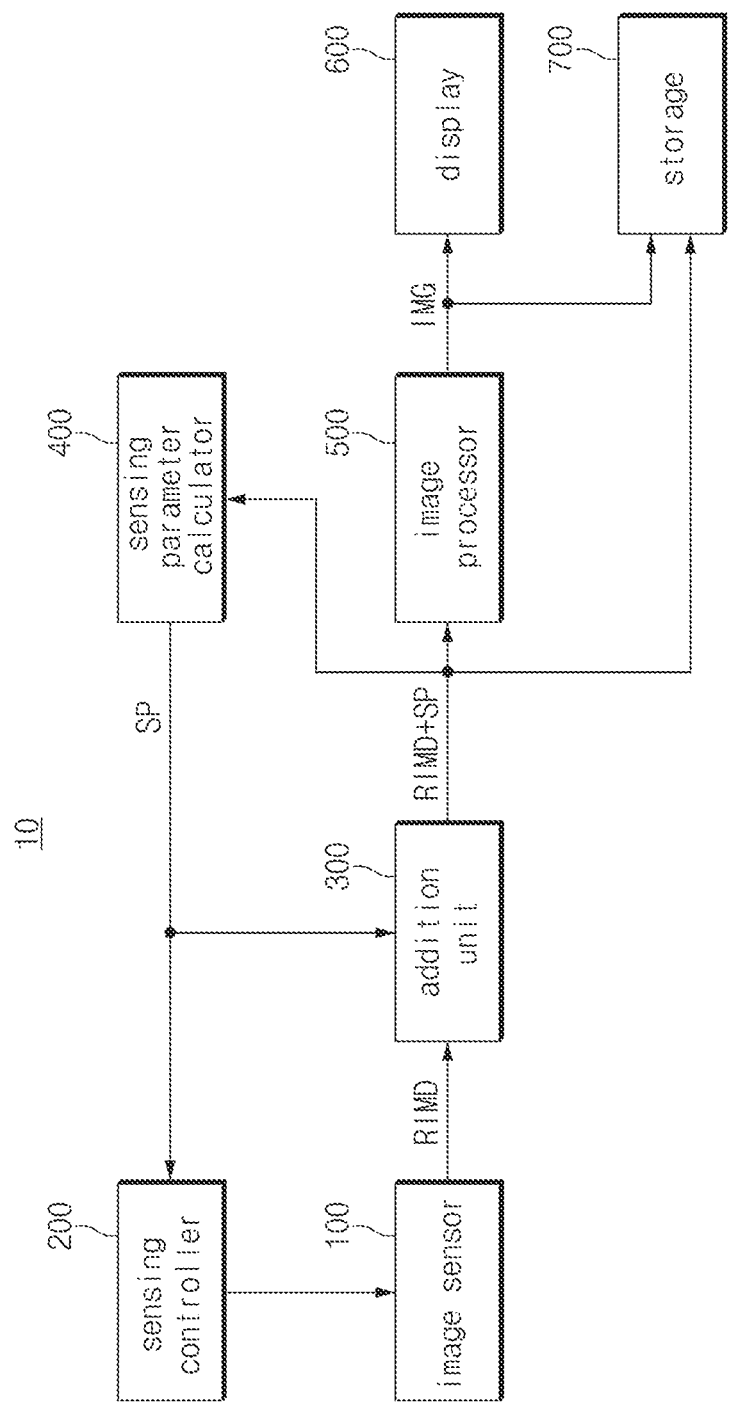
FIG. 1 is a block diagram illustrating an example of an image sensing system based on some implementations of the disclosed technology.

FIG. 1 is a block diagram illustrating an image sensing system based on some implementations of the disclosed technology.

Referring to FIG. 1, the image sensing system 10 may include an image sensor 100, a sensing controller 200, an addition unit 300, a sensing parameter calculator 400, an image processor 500, a display 600, and a storage 700.

The image sensor 100 may photograph a target scene or object (e.g., a target object to be captured), and may convert an optical signal for the photographed object into an electrical signal (can be referred to as a pixel signal), resulting in formation of raw image data RIMD. For example, the image sensor 100 may include a plurality of unit pixels, each of which converts the optical signal obtained by photographing the object into an electrical signal (i.e., a pixel signal), and may convert the pixel signals output from the plurality of unit pixels into digital signals using an analog-to-digital converter (ADC), resulting in formation of raw image data RIMD. The image sensor 100 may be configured such that the sensing conditions required for photographing the object may vary depending on a control signal received from the sensing controller 200.

Unit pixels of the image sensor 100 may include color filters configured to filter light of a specific color from incident light to reach the photosensing element in each pixel while blocking light of other colors from being detected. The color filters may be formed to have different photosensitivities according to respective colors. For example, the unit pixels may include RGB color filters. Since the green color filter (G) has a higher photosensitivity than the red color filter (R) and the blue color filter (B), the unit pixel having green color filter (G) may be saturated faster than the unit pixels having red color filter (R) and the unit pixels having blue color filter (B). If setting an exposure time as a value which allows to prevent the saturation of the unit pixel having green color filter (G), the amount of light in the unit pixels respectively corresponding to red color filter (R) and blue color filter (B) becomes small, which deteriorates the characteristics of signal to noise ratio (SNR). The implementations of the disclosed technology provide the image sensor 100 which photographs a target object by adjusting at least one of an exposure time, a conversion gain, and an analog gain based on the control of the sensing controller 200, thereby compensating for a photosensitivity difference for the color filters corresponding to different colors.

The sensing controller 200 may control at least one of the exposure time, the conversion gain, or the analog gain of the image sensor 100 for each color of the unit pixels based on the sensing parameter (SP). In some implementations, the sensing controller 200 may control one of the exposure time, the conversion gain, or the analog gain of the image sensor 100 for each color of the unit pixels based on the sensing parameter (SP). In some implementations, the sensing controller 200 may control at least two of the exposure time, the conversion gain, or the analog gain of the image sensor 100 for each color of the unit pixels based on the sensing parameter (SP). For example, the sensing parameter (SP) may include information about the exposure time, the conversion gain, and the analog gain for each color of the color filters for the unit pixels, and the sensing controller 200 may receive the sensing parameter (SP) from the sensing parameter calculator 400. Upon receiving a new sensing parameter (SP) from the sensing parameter calculator 400, the sensing controller 200 may again control at least one of the exposure time, the conversion gain, and the analog gain of the image sensor based on the new sensing parameter (SP). The sensing controller 200 may adjust the exposure time and the conversion gain by controlling generation of the transfer signal and the conversion gain control signal for the unit pixels of the image sensor based on the sensing parameter (SP). In some implementations, the sensing controller 200 may adjust the analog gain by controlling the amplitude of the ramp signal for analog-to-digital conversion (ADC) in the image sensor 100 based on the sensing parameter (SP).

The addition unit 300 may receive the sensing parameter (SP) from the sensing parameter calculator 400, and may receive raw image data (RIMD) from the image sensor 100. The addition unit 300 may add the sensing parameter (SP) received from the sensing parameter calculator 400 to the raw image data (RIMD) output from the image sensor 100, and may thus output the resultant data corresponding to the sum of the sensing parameter (SP) and the raw image data (RIMD). Thus, the addition unit 300 may add the sensing parameter SP to the raw image data (RIMD), so that the addition unit 300 can indicate sensing conditions for the raw image data (RIMD) output from the image sensor 100. Hereinafter, image data corresponding to the sum of raw image data (RIMD) and the sensing parameter (SP) will be referred to as parameter added data (RIMD+SP) for convenience of description. The parameter added data (RIMD+SP) may be output to the sensing parameter calculator 400, the image processor 500, and the storage 700.

The sensing parameter calculator 400 may analyze the parameter added data (RIMD+SP) received from the addition unit 300, and may thus generate the sensing parameter (SP) for correcting photosensitivity for each color of the unit pixels. For example, the sensing parameter calculator 400 may divide the parameter added data (RIMD+SP) received from the addition unit 300 into the raw image data (RIMD) and the sensing parameter (SP), and may distinguish raw image data (RIMD) for each color. Thus, the sensing parameter calculator 400 may obtain pixel values for the plurality of unit pixels according to respective colors of the unit pixels. The sensing parameter calculator 400 may calculate a histogram indicating a distribution state of pixel values for each color using the pixel values obtained for each color, and may search for a pixel value (reference pixel value) corresponding to a preset reference value in the histogram. For example, the sensing parameter calculator 400 may search for pixel values corresponding to the top 10% in the histogram for each color, and may determine a reference pixel value of the corresponding color as the pixel value obtained as the result of the search.

The sensing parameter calculator 400 may calculate new sensing parameters for each color using reference pixel values for each color, a current sensing parameter (SP), and a preset maximum pixel value. For example, the sensing parameter calculator 400 may determine an exposure time, a conversion gain and an analog gain of the unit pixels for each color using the reference pixel values for each color, the current gain of the image sensor 100 obtained using the current sensing parameter (SP) and the preset maximum pixel value. When determining the exposure time, the conversion gain, and the analog gain, the sensing parameter calculator 400 may sequentially determine their values in the order of the exposure time→the conversion gain→the analog gain. A detailed method for enabling the sensing parameter calculator 400 to calculate the new sensing parameters will be described later.

The sensing parameter calculator 400 may include a change determination unit (not shown) for determining occurrence or non-occurrence of a change in the object (e.g., movement of the object) by comparing the previous raw image data with the current raw image data. When the sensing parameter calculator 400 has determined an occurrence of such a change (e.g., the object movement), the sensing parameter calculator 400 may not control the exposure time in the process of calculating the new sensing parameter. Alternatively, the sensing parameter calculator 400 may enable a difference in exposure time for each color when there is a change in the object to be shorter than a difference in exposure time for each color when there is no change in the object.

The image processor 500 may separate the raw image data (RIMD) and the sensing parameter SP from each other upon receiving parameter added data (RIMD+SP) from the addition unit 300, and may perform image processing on the raw image data (RIMD) based on the sensing parameter (SP), resulting in formation of an image (IMG). That is, the image processor 500 may determine the sensing condition for the current raw image data (RIMD) using the sensing parameter (SP), and may perform image processing on the raw image data (RIMD) according to the corresponding sensing condition, resulting in formation of an image (IMG) for the object.

The display 600 may output the image (IMG) generated by the image processor 500 on a screen.

The storage 700 may store the parameter added data (RIMD+SP) generated by the addition unit 300 and the image (IMG) generated by the image processor 500.

Figure 2:
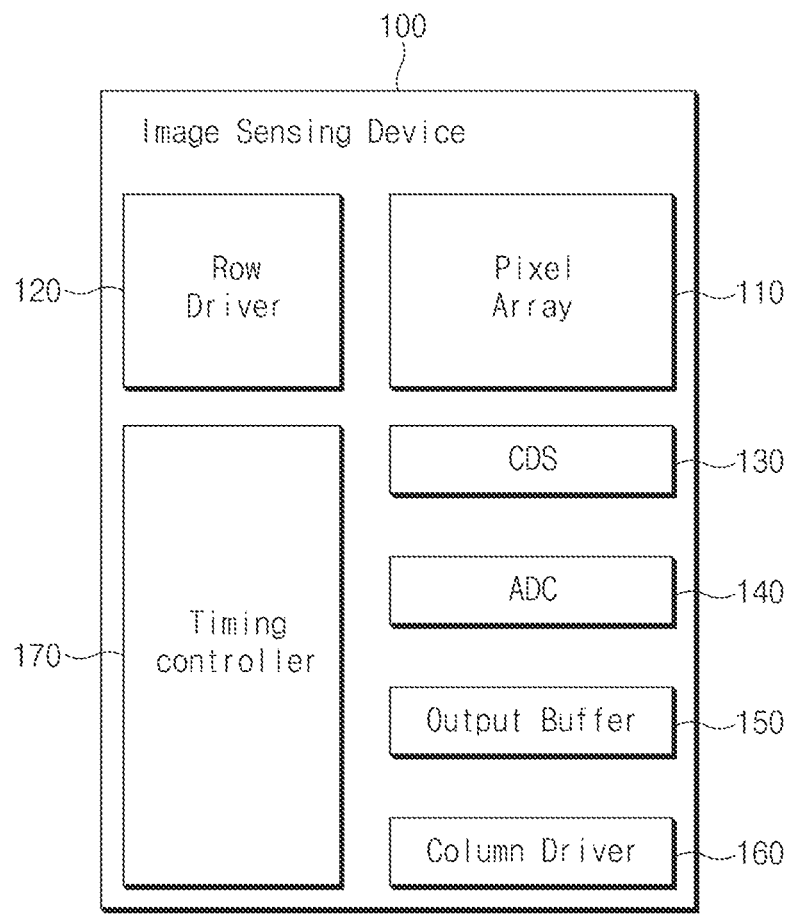
FIG. 2 is a block diagram illustrating an exemplary structure of an image sensor shown in FIG. 1 based on some implementations of the disclosed technology.

FIG. 2 is a block diagram illustrating an exemplary structure of the image sensor 100 shown in FIG. 1.

Referring to FIG. 2, the image sensor 100 may include a pixel array 110, a row driver 120, a correlated double sampler (CDS) 130, an analog-digital converter (ADC) 140, an output buffer 150, a column driver 160 and a timing controller 170. The components of the image sensor 100 illustrated in FIG. 1 are discussed by way of example only, and this patent document encompasses numerous other changes, substitutions, variations, alterations, and modifications.

The pixel array 110 may include a plurality of unit pixels arranged in rows and columns. In one example, the plurality of unit pixels can be arranged in a two dimensional (2D) pixel array including rows and columns. In another example, the plurality of unit pixels can be arranged in a three dimensional (3D) pixel array. The plurality of unit pixels may convert an optical signal into an electrical signal on a unit pixel basis or a pixel group basis, where unit pixels in a pixel group share at least certain internal circuitry. Each of the unit pixels may include a photosensitive element. The photosensitive element may include a photodiode, a photo transistor, a photo gate, a pinned photodiode, or a combination thereof.

The pixel array 110 may receive driving signals (for example, a row selection signal, a reset signal, a transmission (or transfer) signal, a conversion gain control signal, etc.) from the row driver 120. Upon receiving the driving signal, the unit pixels may be activated to perform the operations corresponding to the row selection signal, the reset signal, the transfer signal, and the conversion gain control signal, etc. At this time, the transfer signal and the conversion gain control signal may be changed based on the control of the sensing controller 200, so that an exposure time and a conversion gain of the unit pixels can be adjusted to correspond to color (i.e., color of the color filter) of the corresponding unit pixel.

The row driver 120 may activate the pixel array 110 to perform certain operations on the unit pixels in the corresponding row based on control signals provided by controller circuitry such as the timing controller 170. In some implementations, the row driver 120 may select one or more unit pixels arranged in one or more rows of the pixel array 110. The row driver 120 may generate a row selection signal to select one or more rows from among the plurality of rows. The row driver 120 may sequentially enable the conventional gain control signal, the reset signal, and the transfer signal for the unit pixels arranged in the selected row. At this time, the on/off operation of the conversion gain control signal and the timing of the transfer signal may be controlled for each color of the unit pixels, upon receiving a control signal from the timing controller 170. In this case, the on/off timing of the conversion gain control signal and the transfer signal may be controlled for each color of the unit pixels under control of the timing controller 170. The pixel signals generated by the unit pixels arranged in the selected row may be output to the correlated double sampler (CDS) 130.

The correlated double sampler (CDS) 130 may remove undesired offset values of the unit pixels using correlated double sampling. In one example, the correlated double sampler (CDS) 130 may remove the undesired offset values of the unit pixels by comparing output voltages of pixel signals (of the unit pixels) obtained before and after photocharges generated by incident light are accumulated in the sensing node (i.e., a floating diffusion (FD) node). As a result, the CDS 130 may obtain a pixel signal generated only by the incident light without causing noise. In some implementations, upon receiving a clock signal from the timing controller 170, the CDS 130 may sequentially sample and hold voltage levels of the reference signal and the pixel signal, which are provided to each of a plurality of column lines from the pixel array 110. That is, the CDS 130 may sample and hold the voltage levels of the reference signal and the pixel signal which correspond to each of the columns of the pixel array 110. In some implementations, the CDS 130 may transfer the reference signal and the pixel signal of each of the columns as a correlate double sampling (CDS) signal to the ADC 140 based on control signals from the timing controller 170.

The ADC 140 is used to convert analog CDS signals received from the CDS 130 into digital signals. In some implementations, the ADC 140 may be implemented as a ramp-compare type ADC. The analog-to-digital converter (ADC) 140 may compare a ramp signal received from the timing controller 170 with the CDS signal received from the CDS 130, and may thus output a comparison signal indicating the result of comparison between the ramp signal and the CDS signal. The analog-to-digital converter (ADC) 140 may count a level transition time of the comparison signal in response to the ramp signal received from the timing controller 170, and may output a count value indicating the counted level transition time to the output buffer 150.

The output buffer 150 may temporarily store column-based image data provided from the ADC 140 based on control signals of the timing controller 170. The image data received from the ADC 140 may be temporarily stored in the output buffer 150 based on control signals of the timing controller 170. The output buffer 150 may provide an interface to compensate for data rate differences or transmission rate differences between the image sensor 100 and the addition unit 300.

The column driver 160 may select a column of the output buffer 150 upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal, may select a column of the output buffer 150 using the column selection signal, and may control the data received from the selected column of the output buffer 150 to be output as raw image data (RIMD).

The timing controller 170 may generate signals for controlling operations of the row driver 120, the ADC 140, the output buffer 150 and the column driver 160. The timing controller 170 may provide the row driver 120, the column driver 160, the ADC 140, and the output buffer 150 with a clock signal required for the operations of the respective components of the image sensing device, a control signal for timing control, and address signals for selecting a row or column. The timing controller 170 may adjust the timing of a transfer signal, the on/off operation of a conversion gain control signal, and the amplitude of a ramp signal for each color of the unit pixels, upon receiving a control signal from the sensing controller 200. In some implementations, the timing controller 170 may include a logic control circuit, a phase lock loop (PLL) circuit, a timing control circuit, a communication interface circuit and others.

Figure 3A:
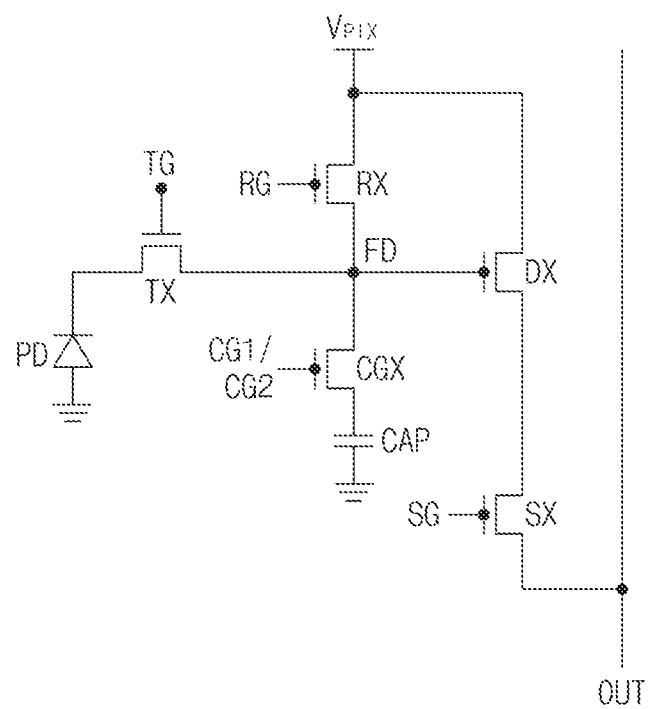
FIGS. 3A and 3B are circuit diagrams illustrating exemplary structures of unit pixels formed in a pixel array shown in FIG. 2 based on some implementations of the disclosed technology.
Figure 3B:
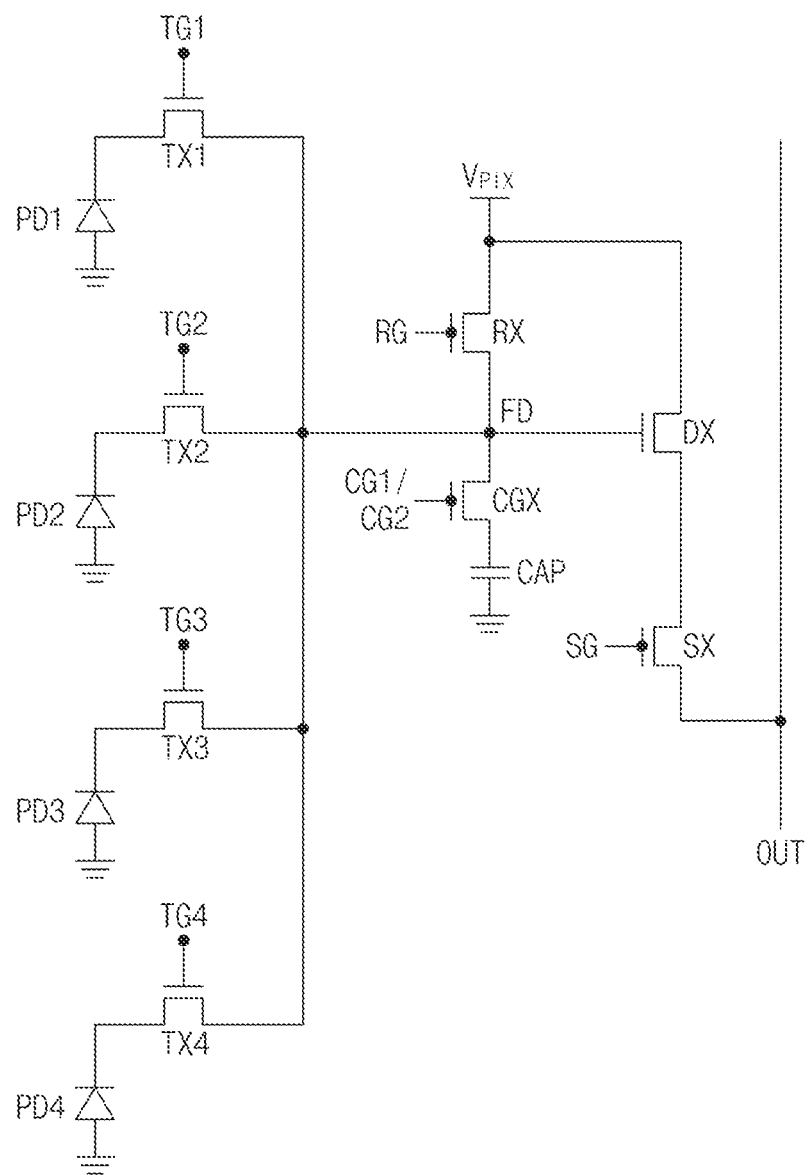

FIGS. 3A and 3B are circuit diagrams illustrating exemplary structures of the unit pixels formed in the pixel array shown in FIG. 2.

Referring to FIG. 3A, the unit pixel of the pixel array 110 may include a photoelectric conversion element PD, a transfer transistor TX, a reset transistor RX, a drive transistor DX, a selection transistor SX, a conversion gain transistor CGX, and a conversion gain capacitor CAP.

The photoelectric conversion element PD may generate and accumulate photocharges corresponding to incident light. For example, the photoelectric conversion element PD may include a photodiode, a photo transistor, a photo gate, a pinned photodiode (PPD), or a combination thereof, but is not limited thereto.

The transfer transistor TX may transmit photocharges accumulated in the photoelectric conversion element PD to a floating diffusion node FD based on the transfer signal (TG).

The floating diffusion node FD may receive and accumulate photocharges generated by the photoelectric conversion element PD. The drive transistor DX may be controlled according to the amount of photocharges accumulated in the floating diffusion node FD.

The reset transistor TX may periodically reset the floating diffusion node FD. When the reset signal RG is enabled and the reset transistor RX is turned on, a pixel power-supply voltage $V_{PIX}$ is transferred to the floating diffusion node FD. Accordingly, photocharges accumulated in the floating diffusion node FD may be discharged such that the floating diffusion node FD can be reset.

The drive transistor DX may be a source follower buffer amplifier that generates a source-drain current in proportion to the amount of charges of the floating diffusion node FD applied to a gate electrode. The drive transistor DX may amplify a change in potential at the floating diffusion node FD, and the amplified signal may be output to an output (column) line (OUT) through the selection transistor SX. A source terminal of the drive transistor DX may be coupled to a pixel power-supply voltage VPIX, and a drain terminal of the drive transistor DX may be coupled to a source terminal of the selection transistor SX. At this time, the conversion gain of the drive transistor DX configured to output an electrical signal in proportion to the amount of charges accumulated in the floating diffusion node FD may vary depending on capacitance of the floating diffusion node FD.

The selection transistor SX may select unit pixels to be read for each column. When the selection transistor SX is turned on by a selection signal SG, the electrical signal (pixel signal) output to the drain electrode of the drive transistor DX may be output to the output line (OUT).

The conversion gain transistor CGX may be coupled in series between the floating diffusion node FD and the conversion gain capacitor CAP. The conversion gain transistor CGX may selectively connect the conversion gain capacitor CAP to the floating diffusion node FD based on conversion gain control signals CG1/CG2. When the conversion gain capacitor CAP is coupled to the floating diffusion node FD, capacitance of the floating diffusion node FD may increase and input impedance of the drive transistor DX may also increase so that the corresponding unit pixel may have a low conversion gain. Conversely, when the conversion gain capacitor CAP is electrically isolated from the floating diffusion node FD, the unit pixel may have a high conversion gain.

Referring to FIG. 3B, the pixel array 110 may include a structure in which the plurality of unit pixels having color filters of the same color shares a single floating diffusion node FD. In other words, the plurality of unit pixels may convert an optical signal on a group basis and thus generate an electrical signal.

The pixel group may include first to fourth photoelectric conversion elements PD1, PD2, PD3, and PD4, and first to fourth transfer transistors TX1, TX2, TX3, and TX4. The first to fourth photoelectric conversion elements PD1, PD2, PD3, and PD4 may share one floating diffusion node FD. The first to fourth photoelectric conversion elements PD1, PD2, PD3, and PD4 may be coupled to the first to fourth transfer transistors TX1, TX2, TX3, and TX4, respectively. For example, the first to fourth photoelectric conversion elements PD1, PD2, PD3, and PD4 may be arranged adjacent to each other in a (2×2) structure.

The first to fourth transfer transistors TX1, TX2, TX3, and TX4 may transmit photocharges accumulated in the first to fourth photoelectric conversion elements PD1, PD2, PD3, and PD4 to the floating diffusion node FD based on the first to fourth transfer signals TG1, TG2, TG3, and TG4, respectively.

The reset transistor RX, the drive transistor DX, the selection transistor SX, the conversion gain transistor CGX, and the conversion gain capacitor CAP may be identical in function to the corresponding transistors and capacitor shown in FIG. 3A.

Figure 4:
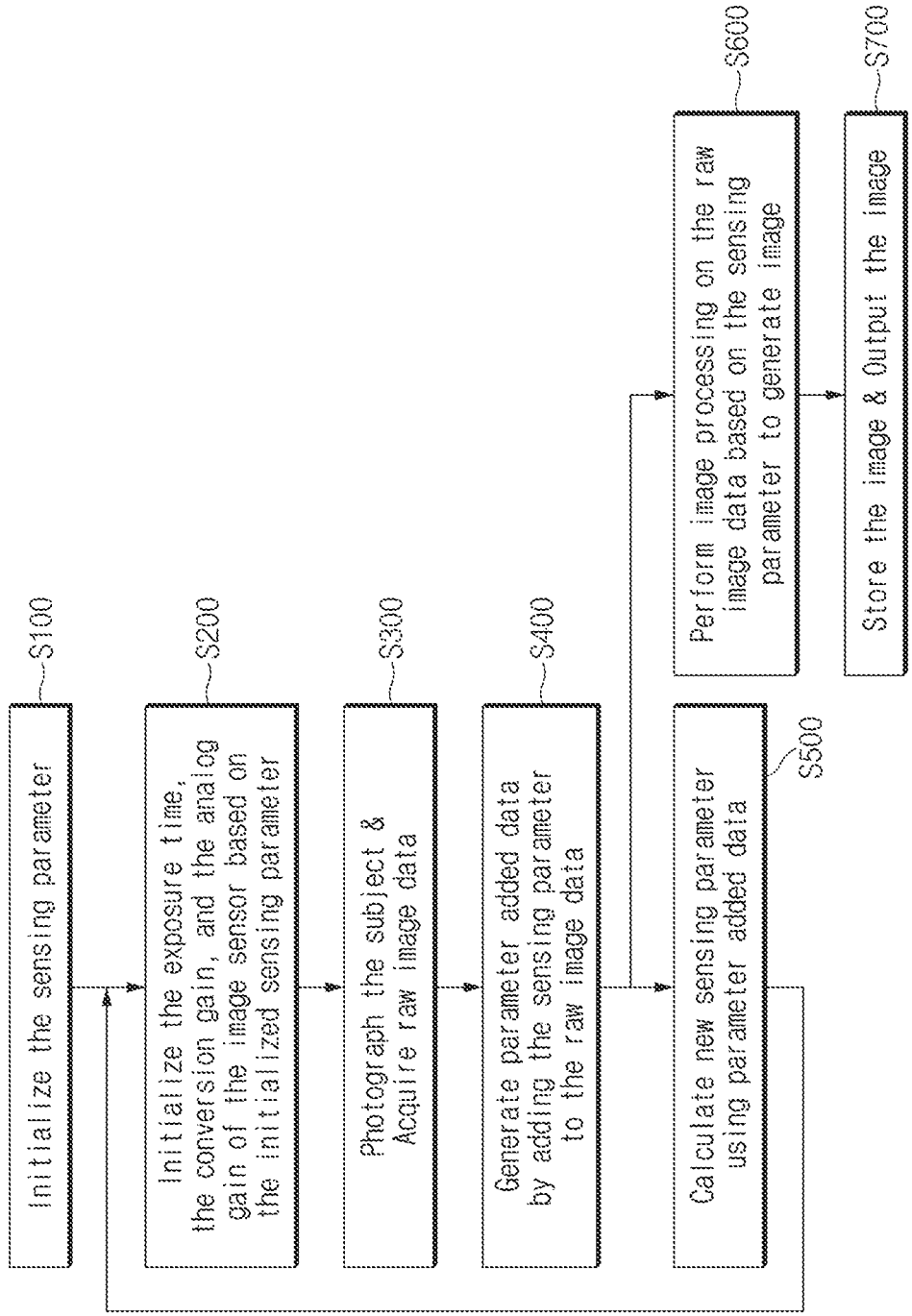
FIG. 4 is a flowchart illustrating an example of a method for operating the image sensing system shown in FIG. 1 based on some implementations of the disclosed technology.
Figure 5:
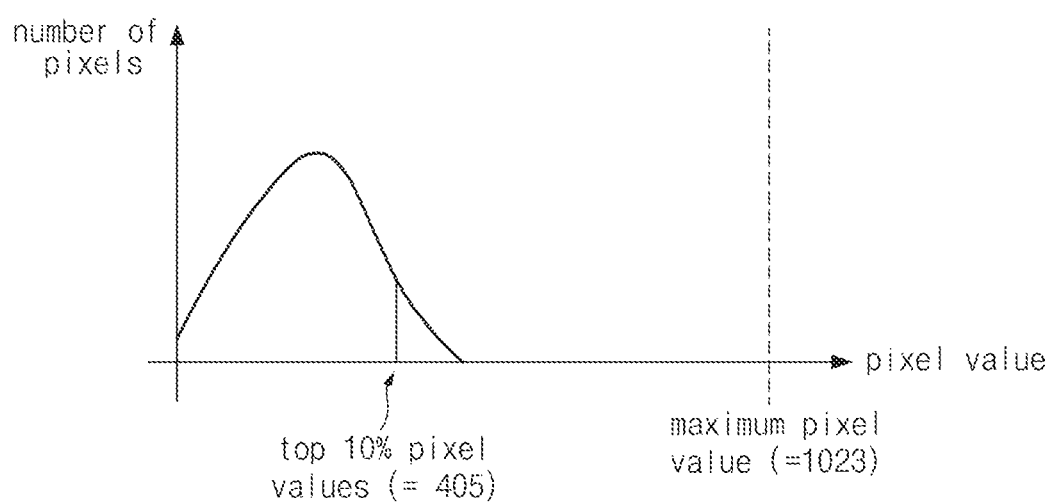
FIG. 5 is a graph illustrating a method for calculating a histogram for pixel values of red color by a sensing parameter calculator shown in FIG. 1 based on some implementations of the disclosed technology.

FIG. 4 is a flowchart illustrating an example of a method for operating the image sensing system shown in FIG. 1. FIG. 5 is a graph illustrating a method for calculating a histogram for pixel values of red color by the sensing parameter calculator shown in FIG. 1.

When the image sensing system 10 starts operation (e.g., when the image sensing system 10 is powered on), the sensing parameter calculator 400 may initialize the sensing parameter (SP) to a preset initial value (S100). The sensing parameter (SP) initialized at the operation 100 may be referred to as the initial sensing parameter (SP).

The sensing parameter (SP) may include information about the exposure time, the conversion gain, and the analog gain for each color of the image sensor 100, and the sensing parameter calculator 400 may initialize the exposure time, the conversion gain, and the analog gain for each color of the unit pixels using the initial sensing parameter (SP). For example, the initial sensing parameter (SP) may be 1.0 times each of the conversion gain, the analog gain, and the exposure time for unit pixels having green color. For each of the unit pixel having red color and the unit pixel having blue color, the initial sensing parameter (SP) may be 1.0 times the conversion gain, may be 1.4 times the analog gain, or may be 1.0 times the exposure time. Thus, the gain of each of the unit pixels having green color may be initialized to 1.0, and the gain of each of the unit pixels having red color and the unit pixels having blue color may be initialized to 1.4.

The sensing parameter calculator 400 may output the initial sensing parameter (SP) to the sensing controller 200 and the addition unit 300.

The sensing controller 200 may control the timing controller 170 of the image sensor 100 based on the initial sensing parameter (SP) received from the sensing parameter calculator 400, such that the sensing controller 200 may initialize the exposure time, the conversion gain, and the analog gain of the image sensor 100 for each color of the unit pixels (S200).

For example, the timing controller 170 of the image sensor 100 may adjust the timing of the transfer signal (TG) for the unit pixels, the on/off operation of the conversion gain control signals (CG1/CG2), and the amplitude of the ramp signal under control of the sensing controller 200. For example, the timing controller 170 may control the conversion gain transistors CGX of the unit pixels to be turned on or off based on the control of the sensing controller 200 so that the conversion gain of each unit pixel is 1.0 times, and the timing controller 170 may control the unit pixels to have the same exposure time so that the exposure time of each unit pixel is 1.0 times. The timing controller 170 may control the amplitude of the corresponding ramp signals so that each of the analog gain for the unit pixels of red color and the unit pixels of blue color is 1.4 times the analog gain of the unit pixels of green color.

The image sensor 100 may photograph a object according to the sensing condition initialized by the sensing controller 200, resulting in formation of raw image data (RIMD) (S300).

The image sensor 100 may convert an optical signal into a pixel signal corresponding to an electrical signal (pixel signal), may convert the pixel signal into a digital signal, may generate raw image data (RIMD) for the photographed object, and may output the generated raw image data (RIMD).

The addition unit 300 may add the initial sensing parameter (SP) received from the sensing parameter calculator 400 to the raw image data (RIMD) output from the image sensor 100, and may thus output parameter added data (RIMD+SP) (S400).

In order to indicate the sensing conditions of the raw image data (RIMD) output from the image sensor 100, the addition unit 300 may add the initial sensing parameter (SP) indicating the sensing condition to the corresponding raw image data (RIMD).

The parameter added data (RIMD+SP) output from the addition unit 300 may be transmitted to the sensing parameter calculator 400 and the image processor 500. In addition, the parameter added data (RIMD+SP) may be transmitted to the storage 700 and stored in the storage 700.

The sensing parameter calculator 400 may calculate a new sensing parameter (SP) based on both the raw image data (RIMD) included in the parameter added data (RIMD+SP) and the current sensing parameter (SP) (S500).

To this end, the sensing parameter calculator 400 may calculate a target gain for the image sensor 100 using the raw image data (RIMD) and the initial sensing parameter (SP), and may determine the exposure time, the conversion gain, and the analog gain for implementing the target gain.

In order to obtain a target gain for the image sensor 100, the sensing parameter calculator 400 may classify the raw image data (RIMD) according to respective colors of the unit pixels, and may calculate a histogram for pixel values for each color as shown in FIG. 5. The classifying the raw image data (RIMD) includes obtaining the raw image data corresponding to the respective color of the unit pixels. The sensing parameter calculator 400 may search for a pixel value (reference pixel value) corresponding to a preset reference value in a histogram for each color. For example, the sensing parameter calculator 400 may determine a pixel value corresponding to the top 10% of the histogram to be a reference pixel value but other implementations are also possible. For example, the reference pixel value can be determined to a pixel value corresponding to the another value without being limited to the top 10% of the histogram.

Subsequently, after finding a reference pixel value for each color through the raw image data (RIMD), the sensing parameter calculator 400 may calculate a target gain for each color using the reference pixel value for each color and a preset maximum pixel value for each color. For example, the sensing parameter calculator 400 may obtain a Y value where the reference pixel value is less than 1/Y of the maximum pixel value, and may determine the largest gain among gains, each of which does not exceed the Y times the current gain from among a plurality of configurable gains of the image sensor 100, to be a target gain.

For example, it is assumed that the configurable gains for the image sensor 100 are set to . . . , 1.4, 2.0, 2.8, 4.0, 5.6, . . . , etc., and a maximum pixel value of the unit pixel having red color filter is 1023 as shown in FIG. 5. Since the unit pixels have the same size of photoelectric conversion elements (PD), it is possible for all the unit pixels to have the same maximum pixel value regardless of color types.

The sensing parameter calculator 400 may classify pixel values for the unit pixels of red color from the raw image data (RIMD) included in the parameter added data (RIMD+SP), and may calculate a histogram for the corresponding pixel values as shown in FIG. 5, such that it can be recognized that the reference pixel value for red color is set to 405 through the calculated histogram. Also, the sensing parameter calculator 400 can recognize that the current gain is set to 1.4 from the sensing parameter (SP) extracted from the parameter added data (RIMD+SP).

As a result, the sensing parameter calculator 400 may recognize the Y value where the reference pixel value 405 is less than 1/Y of the maximum pixel value 1023. That is, the sensing parameter calculator 400 may recognize that the Y value should be less than 1023/405(≒ 2.53). If the range of the Y value is determined, the sensing parameter calculator 400 may recognize the range (<1.4×2.53 ≒ 3.52) of values, each of which is the Y times the current gain (1.4).

The sensing parameter calculator 400 may compare the range of values, each of which is the Y times the current gain (1.4) with each of the configurable gains of the image sensor 100, such that the sensing parameter calculator 400 can search for the largest gain among gains, each of which does not exceed the Y times the current gain (1.4) from among the configurable gains. In some implementations, the configurable gains of the image sensor 100 may be set to . . . , 1.4, 2.0, 2.8, 4.0, 5.6 . . . , etc., such that the largest value from among values, each of which does not exceed 3.52, may be set to 2.8. Accordingly, the sensing parameter calculator 400 may determine a target gain to be 2.8.

That is, if a target gain for red color is set to 2.8, the target gain (2.8) is twice the current gain (1.4), so that the reference pixel value of the top 10% of pixel values expected to be obtained with a target gain may be set to 810, which is twice the reference pixel value 405 of the top 10% of the pixel values obtained with the current gain. In this case, the reference pixel value 810 does not exceed the maximum pixel value 1023, so that the gain (2.8) can be used as a target gain. The configurable gains for the image sensor 100 are set to . . . , 1.4, 2.0, 2.8, 4.0, 5.6 . . . , etc., if a gain (4.0) that is higher than the gain (2.8) by one stage is set to target gain, the gain (4.0) is approximately 2.86 times the current gain 1.4. The reference pixel value of the top 10% for pixel values expected to be obtained with the gain (4.0) may be expected to be 1158.3 (405×2.86), and this reference pixel value exceeds the maximum pixel value (1023) so that the reference pixel value exceeding the maximum pixel value (1023) may be considered inappropriate. As a result, a target gain for red color may be set to 2.8.

In the above-described embodiment, although the reference value for determining the reference pixel value is set to the top 10% for convenience of description, the scope or spirit of the disclosed technology is not limited thereto, and the reference value can be adjusted. For example, in order to reduce the number of saturated pixels, the reference value may be set higher than the top 10%.

If a target gain is determined, the sensing parameter calculator 400 may determine a conversion gain, an analog gain, and an exposure time to realize such a target gain. That is, since the gain of the image sensor 100 is realized through a combination of the conversion gain, the analog gain, and the exposure time, the sensing parameter calculator 400 may determine a conversion gain, an analog gain, and an exposure time to realize a target gain.

In general, when determining the analog gain in the image sensor, the analog gain can be classified into 13 stages or 19 stages within the range from 1 times to 64 times, and the conversion gain can be classified into only two stages of 1 times (1×) and 2 times (2×). In addition, the exposure time can be precisely set in the same manner as in the analog gain, motion artifacts may occur in response to an increasing difference in exposure time for each color of the unit pixels, so that the difference in exposure time for each color of the unit pixels should be restricted within a preset difference.

Due to these restrictions, the sensing parameter calculator 400 may sequentially determine the corresponding values in the order of the conversion gain→the analog gain→the exposure time. For example, as described above, if a target gain is determined to be 2.8, the sensing parameter calculator 400 may allow the conversion gain to be set to 2 times (2×), may allow the analog gain to be set to 1.4 times, and may allow the exposure time to be set to 1.0 times. If the gain is set to 4.0, the sensing parameter calculator 400 may control the conversion gain to be set to 2.0 times, may control the analog gain to be set to 2.0 times, and may control the exposure time to be set to 1.0 times.

Since a target gain for the unit pixels of red color is set to 2.8 as illustrated in the above-described embodiment, the sensing parameter calculator 400 may calculate a new sensing parameter (SP) by which the conversion gain of the unit pixels of red color can be set to 2.0 times, the analog gain of the unit pixels of red color can be set to 1.4 times, and the exposure time of the unit pixels of red color can be set to 1.0 times, thereby outputting the new sensing parameter (SP). Although the above-described embodiment has disclosed only the unit pixels of red color for convenience of description, the scope or spirit of the disclosed technology is not limited thereto, and the sensing parameter calculator 400 may also calculate a new sensing parameter (SP) for the remaining unit pixels of other colors in the same manner as described above, and may thus output the new sensing parameter (SP).

For example, the above-described steps S200 to S500 may be performed repeatedly until the image sensor 100 is powered off.

While such calculation of the sensing parameter is repeatedly performed, the sensing parameter calculator 400 may compare the previous raw image data with the current raw image data, and may determine occurrence or non-occurrence of a change (movement of the object) in the object based on the result of comparison. If occurrence of a change in the object is detected, the sensing parameter calculator 400 may prevent the exposure time from being controlled by the sensing controller 200 when the new sensing parameter is calculated. That is, the sensing parameter calculator 400 may allow only the conversion gain and the analog gain to be reflected in the process of realizing a target gain without reflecting the exposure time in the process of realizing such a target gain. Alternatively, the sensing parameter calculator 400 may control a difference in exposure time for each color of the unit pixels when there is a change in the object to be shorter than a difference in exposure time for each color of the unit pixels when there is no change in the object.

The parameter added data (RIMD+SP) output from the addition unit 300 in step S400 may also be transmitted to the image processor 500. The image processor 500 may divide the parameter added data (RIMD+SP) into the raw image data (RIMD) and the sensing parameter (SP), may perform image processing on the raw image data (RIMD) based on the sensing parameter (SP), resulting in formation of an image (IMG) (S600).

The image processor 500 may determine which one of the sensing condition has been used to acquire the current raw image data (RIMD) through the sensing parameter (SP), and may perform image processing on the raw image data (RIMD) according to the corresponding sensing condition. In more detail, the image processor 500 may determine which one of gain values has been applied to each color of the unit pixels, and may perform image processing on the raw image data (RIMD) according to the determined sensing condition. Here, any one of several conventional image processing methods may be selected and used for implementation of the above-described image processing.

The image (IMG) processed by the image processor 500 may be transmitted to the display 600 and the storage 700, so that the image (IMG) can be displayed on the screen of the display 600 and at the same time can be stored in the storage 700 (S700).

As is apparent from the above description, the image sensing system based on some implementations of the disclosed technology can obtain an image with less noise by more effectively compensating for a difference in photosensitivity for different colors of color filters.

The embodiments of the disclosed technology may provide a variety of effects capable of being directly or indirectly recognized through the above-mentioned patent document.

Although a number of illustrative embodiments have been described, it should be understood that modifications or enhancements to the disclosed embodiments and other embodiments can be devised based on what is described and/or illustrated in this patent document.

What is claimed is:

1. An image sensing system comprising:
    an image sensor including a plurality of unit pixels, each unit pixel configured to convert an optical signal of an object into a pixel signal and including a color filter to allow incident light having a specific color to pass through for generating the optical signal, the image sensor configured to generate raw image data indicative an image of the object from pixel signals output from the plurality of unit pixels;
    a sensing controller communicatively coupled to the image sensor and configured to control, based on a sensing parameter, a sensing condition of the image sensor for each set of the plurality of unit pixels that includes one or more unit pixels corresponding to a same color;
    a parameter addition circuit communicatively coupled to the image sensor and configured to obtain a parameter added data by adding the sensing parameter and the raw image data output from the image sensor; and
    a sensing parameter calculator communicatively coupled to the sensing controller and the parameter addition circuit and configured to calculate a distribution of pixel values for the each set of the plurality of unit pixels based on the parameter added data received from the parameter addition circuit, calculate an updated sensing parameter based on the distribution of pixel values, and transmit the updated sensing parameter to the sensing controller and the parameter addition circuit.

2. The image sensing system according to claim 1, wherein:
    the sensing controller is configured to control at least one of an exposure time, a conversion gain, and an analog gain of the image sensor for the each set of the plurality of unit pixels.

3. The image sensing system according to claim 2, wherein:
    the sensing controller is configured to control the exposure time and the conversion gain by controlling generating of a transfer signal and a conversion gain control signal for the plurality of unit pixels, and control the analog gain by controlling an amplitude of a ramp signal for analog-to-digital conversion (ADC) of the image sensor.

4. The image sensing system according to claim 1, wherein:
    the sensing parameter calculator is further configured to obtain pixel values of the plurality of unit pixels for the each set of the plurality of unit pixels based on the raw image data included in the parameter added data, and calculate a histogram for pixel values for the each set of the plurality of unit pixels.

5. The image sensing system according to claim 4, wherein:
    the sensing parameter calculator is further configured to calculate a reference pixel value corresponding to a preset reference value in the histogram, and calculate a target gain for the each set of the plurality of unit pixels based on the reference pixel value, the sensing parameter, and a preset maximum pixel value.

6. The image sensing system according to claim 5, wherein:
    the sensing parameter calculator is further configured to determine an exposure time, a conversion gain, and an analog gain of the image sensor for the each set of the plurality of unit pixels based on the target gain.

7. The image sensing system according to claim 6, wherein:
    the sensing parameter calculator is further configured to sequentially determining the conversion gain, the analog gain, and the exposure time in order.

8. The image sensing system according to claim 5, wherein:
    the sensing parameter calculator is further configured to determine the target gain to be the largest one among configurable gains of the image sensor.

9. The image sensing system according to claim 5, wherein the sensing parameter calculator is configured to perform operations including:
    calculating a value where the reference pixel value is less than 1/the calculated valued of the preset maximum pixel value; and
    determining the target gain to be the largest one among configurable gains of the image sensor that does not exceed a value obtained by multiplying a current gain and the calculated value.

10. The image sensing system according to claim 1, wherein the sensing parameter calculator is further configured to perform operations including:
    receiving second raw image data from the image sensor;
    determining a change of the object based on a comparison between the raw image data and the second raw image data; and
    upon determining an occurrence of the change, maintaining an exposure time for a corresponding set of the unit pixels.

11. The image sensing system according to claim 1, wherein the sensing parameter calculator is configured to perform operations including:
    receiving second raw image data from the image sensor;
    determining an occurrence of a change of the object based on a comparison between the raw image data and the second raw image data; and
    adjusting a difference in exposure time for the each set of the plurality of unit pixels to a first value when the change is detected and a second value when no change is detected, the first value smaller than the second value.

12. The image sensing system according to claim 1, further comprising:
    an image processor configured to receive the parameter added data from the parameter addition circuit, obtain the raw image data and the sensing parameter from the received parameter added data, process the raw image data based on the sensing parameter, thereby forming the image.

13. The image sensing system according to claim 12, further comprising:
    a display configured to output the image received from the image processor on a screen.

14. The image sensing system according to claim 12, further comprising:
    a storage configured to store the parameter added data and the image.

15. An image sensing system, comprising:
    an image sensor including a first unit pixel set structured to detect light of a first color in incident light from an object to be imaged and a second unit pixel set structured to detect light of a second color in incident light from the object to be imaged;

a sensing controller communicatively coupled to the image sensor and configured to control at least one of an exposure time, a conversion gain, or an analog gain for each of the first unit pixel set and the second unit pixel set; and a sensing parameter calculator communicatively coupled to the sensing controller and configured to calculate a first sensing parameter and a second sensing parameter for the first unit pixel set and the second unit pixel set, respectively, and provide the first sensing parameter and the second sensing parameter to the sensing controller such that the at least one of the exposure time, the conversion gain, or the analog gain for the first unit pixel set is based on the first sensing parameter, and the at least one of the exposure time, the conversion gain, or the analog gain for the second unit pixel set is based on the second sensing parameter, wherein the first sensing para meter and the second sensing are different from each other.

16. The image sensing system of claim 15, further comprising:

a parameter addition circuit communicatively coupled to the image sensor and the sensing parameter calculator and configured to obtain parameter added data for the first unit pixel set and the second unit pixel set based on raw image data output from the first unit pixel set and the second unit pixel set.

17. The image sensing system of claim 15, wherein the sensing parameter calculator is further configured to calculate the first sensing parameter and the second sensing parameter to compensate a photosensitivity difference between the first unit pixel set and the second unit pixel set.

18. The image sensing system of claim 16, wherein the sensing parameter calculator is further configured to calculate target gains for the first unit pixel set and the second unit pixel set based on reference pixels values and a preset maximum pixel value.

19. The image sensing system of claim 16, wherein the sensing parameter calculator is further configured to detect a change at the object based on the raw image data.

20. The image sensing system of claim 19, wherein the sensing parameter calculator is further configured to adjust exposure times for the first unit pixel set and the second unit pixel set such that an exposure time difference between the first unit pixel set and the second unit pixel set becomes smaller when the change at the object is detected as compared to an exposure time difference between the first unit pixel set and the second unit pixel set when there is no change at the object.

* * * * *